April 14, 1964 R. B. RICE 3,129,414
TRANSISTOR TYPE CAPACITY OPERATED RELAY
Filed Dec. 5, 1960
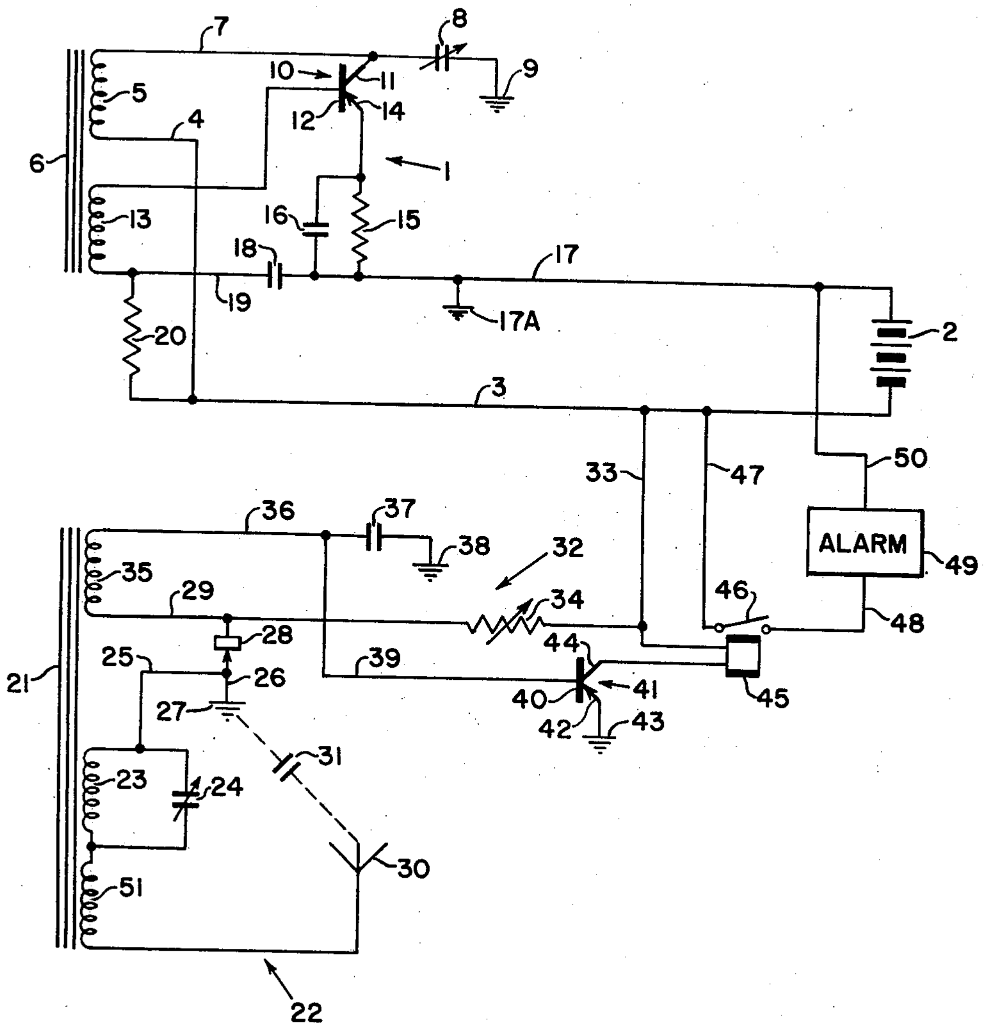
INVENTOR
ROBERT B. RICE
BY Lamont Johnston
ATTORNEY United States Patent Office 3,129,414
Patented Apr. 14, 1964

3,129,414

TRANSISTOR TYPE CAPACITY OPERATED RELAY

Robert B. Rice, 3108 12th Ave., Chattanooga 7, Tenn.

Filed Dec. 5, 1960, Ser. No. 73,913
2 Claims. (Cl. 340—258)

This invention relates to an electric protective system and more particularly to a burglar alarm system of the capacity type in which the approach of an intruder to a place to be protected varies the capacitance in an electric circuit and thereby indirectly operates a relay to energize an alarm.

The prior art in this field uses electron tubes and an oscillator with its high impedance grid circuit, having a variable grid coupling capcitance to set the relay current, so that the relay is inoperative until sufficient power is absorbed from the oscillator circuit by an externally added capacitance, such as a persons body, with the result that the grid bias on the amplifier tube grid is lowered, increasing the plate current so that the relay pulls in. The transistor, being a low impedance input device, cannot be made to work in a fashion similar to that of the electron tube, but must use a separate tuned circuit, as illustrated by this invention.

One object of this invention is to provide a protective system including a detector for sensing both increase and decrease of capacitance at the protected area and producing an output signal which is not proportional to the sensed capacitance.

Another object is to have a highly sensitive protective system in which the detector responds immediately to any change in capacitance at the protected area.

Other objects and advantages of the invention will be apparent from the following description, taken in conjunction with the accompanying drawing, in which:

The single figure of drawings is a wiring diagram for my invention, including an oscillator circuit, a detector circuit, a relay operating circuit, magnetic cores coupling these circuits, an alarm circuit and a source of direct current for energizing all circuits.

Referring now to the drawings, it will be seen that this device includes an oscillator circuit, generally indicated at 1, energized by a source 2 of direct current, such as a battery. The negative side of the battery is connected by leads 3 and 4 to a first inductance 5 which is coupled magnetically to a first magnetic core 6, the inductance being connected through a lead 7 and a variable condenser 8 to a ground 9.

A first transistor, generally indicated at 10, has its collector 11 connected to the lead 7 and its base 12 connected to a second inductance 13, also coupled magnetically to the first magnetic core 6. The emitter 14 of the transistor is connected through a resistance 15 and a capacitance 16, in parallel, through a lead 17 and through a capacitance 18 and a lead 19 to the other side of the inductance 13. The lead 17 is connected to the positive side of the battery 2 and is grounded at 17A. The lead 3 from the negative side of the battery 2 is connected through a resistance 20 to the lead 19 and thereby to the inductance 13.

A second magnetic core 21 is coupled loosely to the first magnetic core 6. A detector circuit, generally indicated at 22, includes a third inductance 23, coupled to the second magnetic core 21, and a variable capacitance 24 connected in parallel with the inductance 23 and tuned to place the detector circuit normally in a resonant condition. The detector circuit is connected through a lead 25 to a lead 26 connected between a ground 27 and a crystal rectifier 28 which, in turn, is connected to a lead 29.

The detector circuit 22 also includes an antenna 30, which is connected to a metal object to be protected, such as a metal safe, cabinet or automobile, not shown. If desired, a plurality of metal objects, not shown, may be wired together in series and connected to the antenna 30. This metal object is, or these metal objects connected in series are insulated from the ground and the insulation constitutes a capacitance 31 betweuen the ground 27 and the anetnna 30, to complete the circuit. The ground 27 may be connected with an external earth ground so that the antenna 30 and its connected metal objects constitute the ungrounded plate, forming the capacitance 31 with an external earth ground. In this way, in contrast with protective devices using electron tubes, it is not necessary to use a power line as the ground and articles such as automobiles may form part of the capacitance 31 and be thereby protected from theft.

A relay operating circuit is generally indicated at 32 and includes a lead 33 connected to the lead 3 and thereby to the negative side of the battery 2 and through an adjustable bias or variable resistance 34 and through the lead 29 to a fourth inductance 35, also coupled to the second magnetic core 21. From the other side of the inductance 35, a lead 36 connects through a capacitance 37 to a ground 38. The lead 36 is also connected by a lead 39 to the base 40 of a second transistor, generally indicated at 41. The emitter 42 of the transistor 41 is connected to ground 43. The collector 44 is connected to a relay coil 45, the other side of which is connected by the lead 33 to the negative side of the battery 2. The relay coil 45, when energized sufficiently, closes a switch 46 connected by a lead 47 to the negative side of the battery 2 and by a lead 48 to an alarm 49, the other side of which is connected by a lead 50 to the positive side of the battery 2.

If desired, a fifth inductance 51, also coupled to the second magnetic core 21, may be connected in series with the antenna 30 in the detector circuit 22 to produce a larger effective capacity change in the detector circuit than actually occurs in practice, thereby increasing the sensitivity of the detector.

The operation of this device may now be understood from the foregoing description. The oscillator circuit 1 produces a steady, alternating high frequency current in inductances 5 and 13, thereby creating a magnetic field in the first magnetic core 6. Since the first magnetic core 6 is coupled loosely to the second magnetic core 21, a magnetic field is also created in the second magnetic core.

Since variable capacitance 24 is adjusted to tune the detector circuit 22 to the same frequency as the oscillator circuit 1, the detector circuit is normally in parallel resonance; in this condition, the line current in the detector circuit is at a minimum and the least possible power from the second magnetic core 21 is absorbed by the inductance 23. Accordingly, the power available to be absorbed by the inductance 35 is at a maximum.

When capacitance is added to the detector circuit 22 by a person's body, either by touching or coming close to the antenna 30, the added capacitance causes the detector circuit to be detuned and thereby to draw additional power from the second magnetic core 21. This effects a reduction of power available to the inductance 35, so that the voltage induced into the inductance 35 is lower than normally, either above or below resonance. This reduced voltage is rectified by the crystal rectifier 28 to produce a lower bucking voltage for the base 40 of the second transistor 41. The induced current in inductance 35 is rectified by the crystal rectifier and is applied as a signal current opposing the bias current flowing from the battery 2 through the base 40 to the emitter 42 circuit, thereby causing a very small current to flow in the emitter 42 to the collector 44 circuit, when resonance exists in inductance 23 and capacitance 24. When nonresonance occurs, the result is to increase the current through the circuit including the collector 44 and the emitter 42 and thus through the relay coil 45, thereby causing the relay coil to pull the switch 46 into closed position. In the closed position of the switch 46, the alarm 49 is connected across the terminals of the battery 2 and is actuated by the battery.

A similar result occurs when the capacitance of the detector circuit 22 is decreased. Thus, should a burglar attempt to steal one of the metal objects wired in series to the antenna 30, cutting or breaking the connecting wire, the amount of the capacitance 31 is reduced, thereby detuning the detector circuit 22, increasing its reactance and increasing the power drawn by the inductance 23 from the second magnetic core 21. The result, again, is to reduce the power available to the inductance 35, reducing the bucking voltage on the base 40 of the second transistor 41, increasing the current through the emitter 42, collector 44 and relay coil 45 to close the switch 46 and activate the alarm 49.

The additional inductance winding 51, as already stated, acts to produce a larger effective capacity change in the detector circuit 22 than actually occurs in practice, thereby increasing the sensitivity of the device. This has the effect of increasing the apparent capacity of the tuned detector circuit 22, including the change (increase) in external capacitance caused by a person's body entering the field or touching the conductors from the tuned circuit. This characteristic of added impedance is very evident in the measurement of capacitors at high frequency, where the inductance of long leads appears to the measurement circuit as a larger than actual capacitance. As already explained, the device is also operated by a reduction in the capacitance connected to the antenna 30.

In thin device, the coupling between the oscillation circuit 1 and the source of energy in the tuned detector circuit 22 is fixed and the transferred power is normally constant. Therefore, the change in the power delivered to the inductance winding 35 in the relay operating circuit 32 depends upon how much power the detector circuit 22 absorbs when it is in a detuned or nonresonant condition. A detuned parallel resonant circuit absorbs more power from the source than does a resonant circuit. Parallel resonance is the condition existing when the resultant current and the line voltage are in phase with each other, so that no net reactance is present and the circulating current is limited only by the pure resistance of the coil and capacitor. This is the lowest power consumption condition that can exist with parallel resonant circuits. This condition causes the lowest line current or absorption of power from a coupled source of energy.

The sensitivity of this device depends upon the "Q," i.e., the width of the resonance curve, of the resonant circuit which is tuned to the lowest point on the resonance curve. Thus, either a unit increase or a unit decrease in the external parallel capacitance causes the same amount of departure from resonance.

The operational point of the relay circuit 32 is variable by the adjustable bias or variable resistor 34. This is desirable in order to compensate for differences in transistors which are now producible.

By this invention, full advantage is taken of the characteristics possessed by transistors, such as low power consumption, immediate operability when turned on and extreme reliability. Batteries for a device made in accordance with this invention can last for a whole year. There is no dependence upon power from an electric power line, power being self-contained for setting off an alarm in the nature of a tear gas device, a siren bomb, etc. This device can be connected so that it will protect itself from being disabled by a would-be burglar, thereby making for maximum reliability.

Since the ground 27 may be connected to an external earth ground, a return ground wire is not needed. When several objects are wired together for protection, cutting any interconnecting wire or the external earth ground wire causes a decrease in capacitance in the detector circuit and actuates the alarm. A similar result occurs if the device is removed from its case or housing. These self-protecting features of the invention are operational characteristics which are not possible with protective devices using electron tubes, as such devices require that the ground be made back through a power line.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. A system for the protection of an object from intruders comprising an oscillator circuit including a first transistor and first and second inductances; a source of direct current energizing the oscillator circuit; a first magnetic core coupled to said inductances; a second magnetic core loosely coupled to the first magnetic core; a parallel tuned capacitance detector circuit including a third inductance coupled to said second magnetic core and an antenna; a relay operating circuit including a relay coil energized by said source of direct current, a second transistor controlling the current to said relay coil and a fourth inductance coupled to said second magnetic core controlling said second transistor; a rectifier connecting said detector circuit with said fourth inductance in said relay operating circuit; an alarm circuit including an alarm device, connections to said source of direct current and a switch operable by said relay coil; a change of capacitance in said detector circuit decreasing the power to said fourth inductance and thereby permitting more current to flow through said second transistor and through said relay coil to close said switch and thereby to actuate said alarm device.

2. The invention according to claim 1 in which a fifth inductance coupled to the second magnetic core is in series with the antenna in the detector circuit.

References Cited in the file of this patent

UNITED STATES PATENTS 2,355,395 Rubenstein ______________ Aug. 8, 1944

OTHER REFERENCES

"Sensitive Capacitance Intruder Alarm" by S. M. Bagno, Electronics, September 16, 1960, pp. 65–67.